(12) United States Patent
Wang et al.

(10) Patent No.: US 10,758,897 B2
(45) Date of Patent: Sep. 1, 2020

(54) COMPOSITE PHOTOCATALYSTS, METHOD FOR MAKING THE SAME AND APPLICATION THEREOF

(71) Applicant: Hangzhou Tong-King Enviro-Tech Co., Ltd, Hangzhou (CN)

(72) Inventors: Sheng Wang, Hangzhou (CN); Tao Wang, Hangzhou (CN); Shenshen Ouyang, Hangzhou (CN)

(73) Assignee: Hangzhou Tong-King Enviro-Tech Co., Ltd, Hangzhou (CN)

( * ) Notice: Subject to any disclaimer, the term of this patent is extended or adjusted under 35 U.S.C. 154(b) by 133 days.

(21) Appl. No.: 16/178,566

(22) Filed: Nov. 1, 2018

(65) Prior Publication Data
US 2019/0381490 A1 Dec. 19, 2019

Related U.S. Application Data

(63) Continuation-in-part of application No. PCT/CN2016/112685, filed on Dec. 28, 2016.

(30) Foreign Application Priority Data

Nov. 7, 2016 (CN) .......................... 2016 1 0975568

(51) Int. Cl.
*B01J 35/00* (2006.01)
*B01J 23/42* (2006.01)
(Continued)

(52) U.S. Cl.
CPC ............. *B01J 35/004* (2013.01); *B01J 23/42* (2013.01); *B01J 23/44* (2013.01); *B01J 23/52* (2013.01);
(Continued)

(58) Field of Classification Search
CPC .... B01J 35/004; B01J 35/008; B01J 35/0086; B01J 23/42; B01J 23/44; B01J 23/52;
(Continued)

(56) References Cited

U.S. PATENT DOCUMENTS 3,145,183 A * 8/1964 Fisher ...................... B01J 23/40
502/9
7,186,474 B2 * 3/2007 Jang ................... B01J 20/28021
206/0.6
(Continued)

FOREIGN PATENT DOCUMENTS

| CN | 101099929 A | 1/2008 |
|----|-------------|--------|
| CN | 102773085 A | 11/2012 |

(Continued)

OTHER PUBLICATIONS

Yoo, J.B. et al., "Controlled Synthesis of Monodiperse SiO2—TiO2 Microspheres with a Yolk-Shell Structure as Effective Photocatalysts", Chem Sus Chem, No. 5, Nov. 6, 2012, p. 2339, left-hand column, paragraph, and the abstract.

(Continued)

*Primary Examiner* — Patricia L. Hailey

(57) ABSTRACT

A composite photocatalyst is provided. The composite photocatalyst includes a nanomotor and a plurality of cocatalysts, the nanomotor comprises a shell formed by porous material, at least one inner core formed by a photocatalyst, and a cavity between the shell and the at least one inner core, the plurality of cocatalysts are located in the cavity. The plurality of cocatalysts are selected from the group consisting of metal nanoparticles, metal oxide nanoparticles, metal sulfide nanoparticles, phosphate nanoparticles, up-conversion material nanoparticles, and any combination thereof. A method for making the composite photocatalyst and application thereof are further provided. The plurality of cocata- (Continued)

lysts and the nanomotor forms a photocatalytic synergistic reaction system, improving photo-catalytic activity of the composite photocatalyst.

19 Claims, 13 Drawing Sheets

(51) Int. Cl.
| | |
|---|---|
| B01J 23/44 | (2006.01) |
| B01J 23/52 | (2006.01) |
| B01J 23/72 | (2006.01) |
| B01J 27/051 | (2006.01) |
| B01J 27/12 | (2006.01) |
| B01J 27/125 | (2006.01) |
| B01J 27/24 | (2006.01) |
| B01J 35/02 | (2006.01) |
| B01J 35/08 | (2006.01) |
| B01J 37/34 | (2006.01) |

(52) U.S. Cl.
CPC .......... *B01J 23/72* (2013.01); *B01J 27/051* (2013.01); *B01J 27/12* (2013.01); *B01J 27/125* (2013.01); *B01J 27/24* (2013.01); *B01J 35/0006* (2013.01); *B01J 35/023* (2013.01); *B01J 35/08* (2013.01); *B01J 37/344* (2013.01)

(58) Field of Classification Search
CPC . B01J 23/72; B01J 27/051; B01J 27/12; B01J 27/125; B01J 27/24; B01J 35/0006; B01J 35/023; B01J 35/08; B01J 37/344

USPC .............................. 502/5, 300; 977/754, 780
See application file for complete search history.

(56) References Cited

U.S. PATENT DOCUMENTS

| | | | | |
|---|---|---|---|---|
| 7,659,224 | B2* | 2/2010 | Shimazaki | B01J 23/42 |
| | | | | 420/460 |
| 9,212,200 | B2* | 12/2015 | Mandelbaum | C07F 19/00 |
| 9,842,962 | B2* | 12/2017 | Woo | H01L 33/06 |
| 2005/0082521 | A1* | 4/2005 | Torimoto | B01J 27/04 |
| | | | | 257/17 |
| 2010/0303716 | A1* | 12/2010 | Jin | A61M 37/0092 |
| | | | | 424/1.11 |
| 2019/0126257 | A1* | 5/2019 | Lu | B01J 35/004 |

FOREIGN PATENT DOCUMENTS

| | | | | |
|---|---|---|---|---|
| CN | 10 6592005 | * | 4/2017 | ............ B01J 31/26 |
| CN | 10 6607016 | * | 5/2017 | ............ B01J 21/18 |
| CN | 10 6694055 | * | 5/2017 | ............ B01J 31/26 |
| CN | 10 7224981 | * | 10/2017 | ............ B01J 23/89 |

OTHER PUBLICATIONS

Liu, J. et al., "Yolk-Shell Hybrid Materials with a Periodic Mesoporous Organosilica Shell: Ideal Nanoreactors for Selective Alcohol Oxidation", Adv. Funct. Mater., No. 22, Nov. 25, 2011, the abstract.
Wang, S. et al., "Phase-selectivity Photocatalysis: a New Approach in Organic Pollutants" Commun., No. 2008, Jun. 12, 2008, the abstract.
International Search Report of PCT/CN2016/112685.

* cited by examiner

COMPOSITE PHOTOCATALYSTS, METHOD FOR MAKING THE SAME AND APPLICATION THEREOF

CROSS-REFERENCE TO RELATED APPLICATIONS

This application claims all benefits accruing under 35 U.S.C. § 119 from China Patent Application No. 201610975568.4, filed on Nov. 7, 2016, in the State Intellectual Property Office of China, the content of which is hereby incorporated by reference. This application is a continuation-in-part under 35 U.S.C. § 120 of international patent application PCT/CN2016/112685, filed on Dec. 28, 2016, the content of which is also hereby incorporated by reference.

FIELD OF THE DISCLOSURE

The present disclosure relates to nanomotor material, and more particularly, to a composite photocatalyst.

BACKGROUND OF THE DISCLOSURE

Since the 19th century, advanced machines have been developed and marked as human civilization. Invention of power machines such as heat engines was the beginning of modern machine manufacturing and the great industrial revolution was arisen. Building a more complex machine at the micron or even nanometer level is the ultimate goal of the ascendant nano-science. The realization of this goal may trigger a new round of industrial revolution, which will bring profound and huge impact to human society. Nanomotor is a power-assisting machine in nanometer scale. It is a pioneer of nano-machinery, and its importance can be regarded as the position of steam engine in the industrial revolution. Whitesides et al. discovered the first synthetic catalytic motor, it was able to convert chemical energy into its own kinetic energy.

However, artificial nanomotors are still in infancy stage, compared to the diversity of macroscopic motors that are almost ingrained in all aspects of technology. How to build more complex nanomotors to complete more complex work is still a challenge for researchers. In recent years, the application of automatic micro motors in the field of biomedicine has made great progress, converting energy into mechanical motion to promote its directional motion, which gives hope for the development of micro robots and nano robots. In this regard, people have worked on the manufacture of nanomotors, allowing motors to be propelled through different mechanisms, such as self-electrophoresis, diffusion electrophoresis, bubble propulsion, and external stimuli (such as light, ultrasonic electromagnetic fields, and local electric fields). This has led to the emergence of various nanomotors, such as nanowires, rods, spherical Janus micro motors, and tubular microjets, which have been used to detect ions, bio-imaging, manipulate drug delivery and cell separation, and intracellular advancement. In addition to biomedicine, nanomotors have some unexpected applications and technologies. Recently, nanomotors have also been used to move in contaminant solutions and perform required sensing and cleaning activities in environmental field.

On the other hand, photocatalytic technology is a new technology using sunlight and discovered in the 1970s, which excites transfer of electrons and holes in the catalyst under light, thereby having a strong oxidative ability to degrade organics. At present, photocatalyst have been applied in various fields such as environmental purification, self-cleaning, medical treatment, and antibacterial.

Since the photocatalyst must reach nanometer level to effectively express the photocatalytic performance, the photocatalyst is required to a nanometer size. This leads to problems as following:

(1) When the photocatalyst is irradiated under light, a plurality of electron-hole pairs are generated inside and on the surface of the photocatalyst. Due to the extremely short time, majority of the plurality of electron-hole pairs are combined and quench before diffusing to the surface. This leads to low catalytic efficiency of the photocatalyst in actual applicant.

(2) Since the photocatalyst in nanometer scale are easy to agglomerate, the surface area of the photocatalyst is reduced, which is not good for separation of electron and hole, resulting in catalytic activity greatly reduced and low photocatalytic efficiency.

(3) The photocatalyst can be used with a limited carrier. When it is supported on an inorganic carrier, the effective catalytic area is a plane and small, therefore the catalytic efficiency is low. When it is supported on an organic carrier, the photocatalyst is likely to cause photo-corrosion to the organic carrier, and the photocatalyst would loss, resulting in waste and a secondary pollution.

(4) Due to nanometer scale of the photocatalyst, the photocatalyst is difficult to be recycled and reused after catalytic reaction, which is likely to cause secondary pollution.

SUMMARY OF THE DISCLOSURE

To solve the above-mentioned problem, a composite photocatalysts, method for making the same and application thereof is provided.

A composite photocatalyst is provided. The composite photocatalyst comprises a nanomotor and a plurality of cocatalysts, the nanomotor comprises a shell formed by porous material, at least one inner core formed by a photocatalyst, and a cavity between the shell and the at least one inner core. The plurality of cocatalysts are located in the cavity. The plurality of cocatalysts are selected from the group consisting of metal nanoparticles, metal oxide nanoparticles, metal sulfide nanoparticles, phosphate nanoparticles, up-conversion material nanoparticles, and any combination thereof.

In a preferred embodiment, part of the plurality of cocatalysts can be located on outer surface of the photocatalyst. In a preferred embodiment, the plurality of cocatalysts can have crystalline or dendritic shape.

In a preferred embodiment, the metal nanoparticles can be selected from the group consisting of platinum nanoparticles, gold nanoparticles, palladium nanoparticles, silver nanoparticles, and any combination thereof; the metal oxide nanoparticles can be selected from the group consisting of zinc oxide nanoparticles, copper oxide nanoparticles, manganese oxide nanoparticles, nickel oxide nanoparticles, cobalt oxide nanoparticles, iron oxide nanoparticles, molybdenum oxide nanoparticles, cerium oxide nanoparticles, cerium oxide nanoparticles, cerium oxide nanoparticles, and any combination thereof; the metal sulfide nanoparticles can be selected from the group consisting of $MoS_2$ nanoparticles, ZnS nanoparticles, CuS nanoparticles, NiS nanoparticles, CoS nanoparticles, and any combination thereof; the phosphate nanoparticles are selected from the group consisting of $Ag_3PO_4$ nanoparticles, $LaPO_4$ nanoparticles, BiPO$_4$ nanoparticles, and any combination thereof; and the up-conversion material nanoparticles can comprise rare-earth ion doped compounds.

In a preferred embodiment, the porous material can comprise silica porous material, glass porous material, and aluminum phosphate porous material.

In a preferred embodiment, the porous material can comprise a plurality of holes, diameter of the plurality of holes is less than size of the photocatalyst.

In a preferred embodiment, the diameter of the plurality of holes can be larger than 0 nanometer and less than approximately 10 nanometers.

In a preferred embodiment, the photocatalyst can be selected from the group consisting of TiO$_2$, WO$_3$, Fe$_3$O$_4$, Bi$_2$O$_3$, BiOBr, BiOI, SnO$_2$, Nb$_2$O$_5$, Ta$_2$O$_5$, CdSe, CdTe, GaN, Ta$_3$N$_5$, TaON, C$_3$N$_4$, CdS, PbS, CuInS$_2$, AgInS$_2$, ZnIn$_2$S$_4$, GaP, SiC, LaTiON, Sm$_2$Ti$_2$S$_2$O$_5$, titanate, germanate, niobate, vanadate, tantalate, antimonate, molybdate, selenate, indate, chromate, stannate, TaO$_4$, Ag$_2$O, AgCl, AgBr, AgI, AgInZn$_7$S$_9$, β-AgGaO$_2$, β-AgInO$_2$, α-AgGaO$_2$, α-AgInO$_2$, AgCrO$_2$, Ag$_2$CrO$_4$, AgAlO$_2$, AgNbO$_3$, InVO$_4$, InNbO$_4$, InTaO$_4$, BiNbO$_4$, BiTaO$_4$, anion/cation doped photocatalyst, solid solution photocatalyst, semiconductor composite photocatalyst, NaNbO$_3$—AgNbO$_3$, KCa$_2$Nb$_3$O$_{10}$, Ba$_5$Ta$_4$O$_{15}$, HCa$_2$Nb$_3$O$_{10}$, and any combination thereof.

A method for making a composite photocatalyst is provided. The method comprises following steps:

providing a nanomotor, wherein the nanomotor comprises a shell formed by porous material, at least one inner core formed by a photocatalyst, and a cavity between the shell and the at least one inner core; and forming a plurality of cocatalysts in the cavity, and part of the plurality of cocatalysts are located on outer surface of the photocatalyst, wherein the plurality of cocatalysts are selected from the group consisting of metal nanoparticles, metal oxide nanoparticles, metal sulfide nanoparticles, phosphate nanoparticles, up-conversion material nanoparticles, and any combination thereof.

In a preferred embodiment, the plurality of cocatalysts in the cavity can be formed as follows:

providing a cocatalyst precursor mixture comprising a cocatalyst precursor;

immersing the nanomotor in the cocatalyst precursor mixture, making the cocatalyst precursor mixture enter the cavity, and obtaining a first mixture; and irradiating the first mixture with light, and making the cocatalyst precursor reacting to obtain the plurality of cocatalysts, wherein the plurality of cocatalysts comprises the metal nanoparticles.

In a preferred embodiment, in the step of irradiating the first mixture with light, a in-situ photochemical reduction reaction can undergo on the cocatalyst precursor to form the plurality of cocatalysts.

In a preferred embodiment, the cocatalyst precursor can comprise at least one of chloroplatinic acid, chloroauric acid, chloropalladic acid, and silver nitrate.

In a preferred embodiment, the cocatalyst precursor mixture can be prepared by mixing the cocatalyst precursor with a first organic solvent.

In a preferred embodiment, the first organic solvent can be selected from the group consisting of methanol, ethanol, formic acid, triethanolamine, triethylamine, acetonitrile, and any combination thereof.

In a preferred embodiment, the plurality of cocatalysts in the cavity can be formed as follows:

providing the plurality of cocatalysts comprising at least one of the metal oxide nanoparticles, the metal sulfide nanoparticles, the phosphate nanoparticles, and the up-conversion material nanoparticles;

dispersing the plurality of cocatalysts in water and obtaining cocatalyst solution;

dispersing the cocatalyst solution in a second organic solvent and obtaining a second mixture; and immersing the nanomotor in the second mixture and making the plurality of cocatalysts enter the cavity.

In a preferred embodiment, the second organic solvent is selected from the group consisting of methanol, ethanol, formic acid, triethanolamine, triethylamine, acetonitrile, and any combination thereof.

An application of the composite photocatalyst is provided. The composite photocatalyst can be configured to degrade organics.

The composite photocatalyst has following advantages:

Firstly, the plurality of cocatalysts are synergistically catalyzed with the photocatalyst in the nanomotor to achieve a more excellent photocatalytic effect.

When the plurality of cocatalysts are metal nanoparticles, on the one hand, the metal nanoparticle and the photocatalyst have different Fermi levels, and electron transfer will occur when the metal nanoparticle and the photocatalyst contact with each other, and a Schottky energy barrier will be formed, which can effectively act as an electron trap, thereby blocking recombination of electrons and holes; on the other hand, the metal nanoparticles can act as a receiver for photo-generated electrons, which can promote the transport of interfacial charge carriers in the composite photocatalyst and the separation of photo-generated electrons and photo-generated holes, and a redox reaction undergoes between the photo-generated electrons and the substances adsorbed on the surface of the photocatalyst. Or the photo-generated electrons can be trapped by surface lattice defects of the metal nanoparticles, causing photo-generated electrons to accumulate on the surface of the metal nanoparticles, while holes remain on the surface of the photocatalyst, reducing the recombination rate of photo-generated electrons and holes, and improving the catalytic activity of the photocatalyst.

When the plurality of cocatalysts are the metal oxide nanoparticles, the metal oxide nanoparticles will changes energy level structure of the photocatalyst, and a barrier and a energy difference at the interface of the metal oxide nanoparticles and the photocatalyst are formed, affecting migration process of photo-generated electrons and holes and improving charge separation. The effect is to expand the spectral sensitivity range of the photocatalyst, promote the separation of electrons and holes of the photocatalyst, and improve the catalytic efficiency of the photocatalyst.

When the plurality of cocatalysts are the metal sulfide nanoparticles, the metal sulfide nanoparticles will changes energy level structure of the photocatalyst, and a barrier and a energy difference at the interface of the metal sulfide nanoparticles and the photocatalyst are formed, affecting migration process of photo-generated electrons and holes and improving charge separation. The effect is to expand the spectral sensitivity range of the photocatalyst, promote the separation of electrons and holes of the photocatalyst, and improve the catalytic efficiency of the photocatalyst.

When the plurality of cocatalysts are the phosphate nanoparticles, the phosphate nanoparticles will changes energy level structure of the photocatalyst, and a barrier and a energy difference at the interface of the phosphate nanoparticles and the photocatalyst are formed, affecting migration process of photo-generated electrons and holes and improving charge separation. The effect is to expand the spectral sensitivity range of the photocatalyst, promote the separation of electrons and holes of the photocatalyst, and improve the catalytic efficiency of the photocatalyst.

When the plurality of cocatalysts are the up-conversion material nanoparticles, the up-conversion material nanoparticles can convert infrared light and visible light into ultraviolet light that can be absorbed and utilized by the photocatalyst, indirectly expand the utilization range of the light, and can maintain higher reactivity of the photo-generated electrons and holes. Therefore, the composite photocatalyst has excellent photo-catalytic effect.

Secondly, the plurality of cocatalysts have a three-dimensional structure and is spatially separated from each other, which increases the specific surface area of the composite photocatalyst, therefore the composite photocatalyst has larger contact areas and more active points in the photocatalytic reaction. When the nanomotor of the composite photocatalyst has a plurality of inner cores, therefore the composite photocatalyst has larger contact areas and more active points in the photocatalytic reaction, which improves the photocatalytic performance of the composite photocatalyst.

Thirdly, the cavity of the nanomotor provides a reaction site for the photocatalytic reaction, which is beneficial for organic pollutants to be absorbed into the cavity, thereby the adsorption and photocatalytic degradation process is completed to achieve the self-driven absorption and degradation affect of the nanomotor. The process of the organic pollutants entering the cavity is as follows: when the nanomotor is irradiated with light, minority of the organic pollutants flow into the nanomotor due to a capillary effect. The photocatalytic reaction is taken between the organic pollutants and the photocatalyst and the plurality of cocatalysts and a gas product releases. With the gas discharges from the cavity to the outside of the shell, a pressure difference between the cavity and the outside of the shell is existed and more organic pollutants flow into the cavity of the nanomotor, thereby achieving the photocatalytic reaction undergoing continuously.

Fourthly, the photocatalyst is not contacted with the shell, so that the specific surface area of the photocatalyst is not substantially reduced, and the contact of the light with the photocatalyst does not be affected by the shell, avoiding photo-etching of the photocatalyst and the organic carrier when the photocatalyst is supported by the organic carrier in the prior art.

Fifthly, the plurality of cocatalysts are formed in the cavity and the photocatalyst is disposed as the inner core, which is beneficial for recovery and reuse of the plurality of cocatalysts and the photocatalyst.

The method for making composite photocatalyst has following advantages:

When the plurality of cocatalysts include at least one of metal sulfide nanoparticles, phosphate nanoparticles, and up-conversion material nanoparticles, the plurality of cocatalysts are dispersed in the second organic solvent, and then the plurality of cocatalysts diffuse and enter in the cavity.

When the plurality of cocatalysts include metal nanoparticles, the cocatalyst precursor enters the cavity when the nanomotor is immersed in the cocatalyst precursor mixture. When the procatalyst precursor is irradiated under light, the procatalyst precursor reacts and the plurality of cocatalysts are formed. It should be noted that, as the concentration of the cocatalyst precursor in the cavity decreases, more cocatalyst precursors from the outside of the shell will enter the cavity.

The method has simple steps, is easy to implement, and can be industrialized.

The composite photocatalyst provided in this application has high photocatalytic activity and can be applied to degrade organic matter.

BRIEF DESCRIPTION OF THE DRAWINGS

References are made to the accompanying drawing(s) to better illustrate the present invention. However, the accompanying drawings represents only some embodiments of the disclosure, and are not meant to be exhaustive.

DETAILED DESCRIPTION OF THE DISCLOSURE

The following description will render a clear and complete description of the present disclosure in combination with the embodiments and accompanying drawings. Obviously, the embodiments described herein are only part but not all embodiments of the disclosure. Any other embodiments obtained by those of skill in the art without making inventive efforts shall all be covered within the protection of the disclosure.

Figure 1:
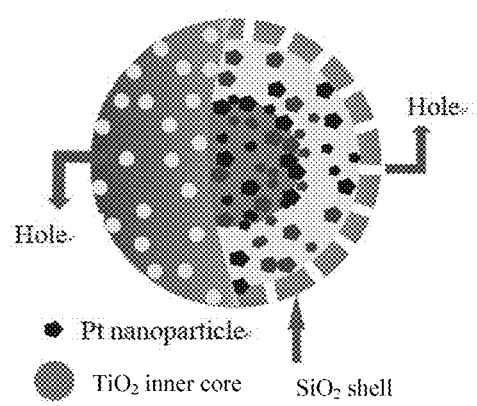
FIG. 1 is a model diagram of a composite photocatalyst of embodiment 1.

Referring to FIG. 1, a composite photocatalyst is provided. The composite photocatalyst includes a nanomotor and a plurality of cocatalysts. The nanomotor includes a shell formed by porous material, at least one inner core formed by a photocatalyst, and a cavity between the shell and the at least one inner core. The plurality of cocatalysts are located in the cavity. The plurality of cocatalysts are selected from the group consisting of metal nanoparticles, metal oxide nanoparticles, metal sulfide nanoparticles, phosphate nanoparticles, up-conversion material nanoparticles, and any combination thereof.

Part of the plurality of cocatalysts are located on outer surface of the photocatalyst. That is, one part of the plurality of cocatalysts may be deposited on the outer surface of the photocatalyst, the other part of the plurality of cocatalysts may be located in the cavity and not contacted with the outer surface of the photocatalyst. Maybe in the process of degrading the organic pollutes, the photocatalyst will move and the other part of the plurality of cocatalysts will contact with the moving photocatalyst. The plurality of cocatalysts are separated with each other. The plurality of cocatalysts can have a three-dimensional structure and high crystallinity.

Figure 4A:
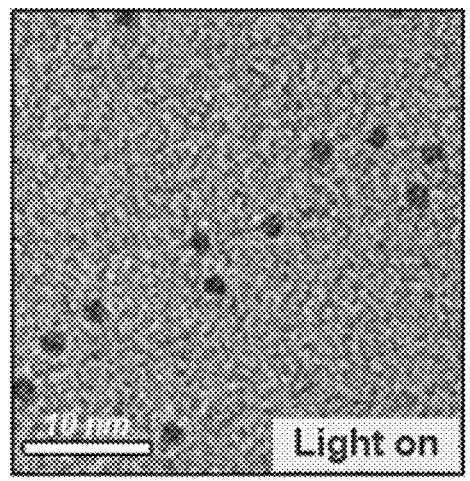
FIG. 4A is a transmission electron micrograph of the first mixture irradiated under UV light in a process for making the composite photocatalyst of FIG. 1.
Figure 4B:
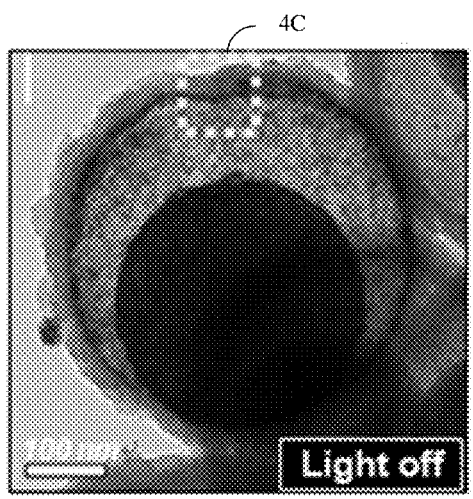
FIG. 4B is a transmission electron micrograph of the composite photocatalyst obtained of FIG. 4A.
Figure 4C:
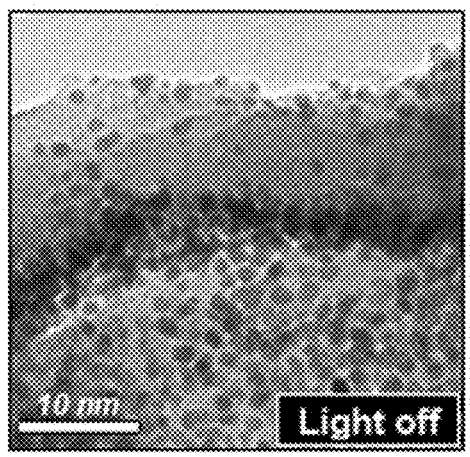
FIG. 4C is an enlarged transmission electron micrograph of the composite photocatalyst of FIG. 4B.
Figure 6:
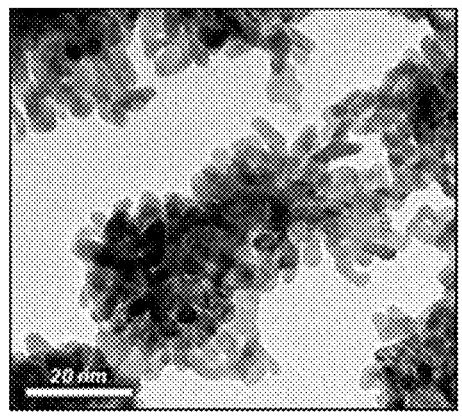
FIG. 6 is a transmission electron micrograph of the plurality of cocatalysts of the composite photocatalyst of another embodiment.

The plurality of cocatalysts can have crystalline or dendritic shape. As shown in FIG. 4C, the plurality of cocatalyst nanoparticles stack and form crystalline cocatalysts. As shown in FIG. 6, the plurality of cocatalyst nanoparticles stack and form dendritic cocatalysts. A ratio between the mass of the plurality of cocatalysts and the mass of the photocatalyst is not limited. In preferred embodiment, the ratio between the mass of the plurality of cocatalysts and the mass of the photocatalyst can be in a range of 0.1% to 100%. In another preferred embodiment, the ratio between the mass of the plurality of cocatalysts and the mass of the photocatalyst can be in a range of 0.5% to 20%, in order to gain better photo-catalytic effect.

The metal nanoparticles can be selected from the group consisting of platinum nanoparticles, gold nanoparticles, palladium nanoparticles, silver nanoparticles, and any combination thereof. The metal oxide nanoparticles can be selected from the group consisting of zinc oxide nanoparticles, copper oxide nanoparticles, manganese oxide nanoparticles, nickel oxide nanoparticles, cobalt oxide nanoparticles, iron oxide nanoparticles, molybdenum oxide nanoparticles, cerium oxide nanoparticles, cerium oxide nanoparticles, cerium oxide nanoparticles, and any combination thereof. The metal sulfide nanoparticles are selected from the group consisting of $MoS_2$ nanoparticles, ZnS nanoparticles, CuS nanoparticles, NiS nanoparticles, CoS nanoparticles, and any combination thereof. The phosphate nanoparticles are selected from the group consisting of $Ag_3PO_4$ nanoparticles, $LaPO_4$ nanoparticles, $BiPO_4$ nanoparticles, and any combination thereof. And the up-conversion material nanoparticles can comprise rare-earth ion doped compounds, like a rare-earth ion doped fluoride, a rare-earth ion doped oxide, a rare-earth ion doped sulfur compound, a rare-earth ion doped oxy-fluoride, and a rare-earth ion doped halide. In an embodiment, the up-conversion material nanoparticles can be Yb, Er doped $NaYF_4$ nanoparticles, Tm doped $NaGdF_4$ nanoparticles, or Ho doped $NaGdF_4$ nanoparticles.

The type of the porous material is not limited as long as the porous material includes a plurality of pores. The porous material can be silica porous material, glass porous material, and aluminum phosphate porous material.

As shown in FIG. 1, the diameter of the plurality of holes is less than a size of the photocatalyst. The size of the photocatalyst can be a length of the photocatalyst or a diameter of the photocatalyst. The plurality of holes can be a channel between the cavity and the outside of the porous material. In a preferred embodiment, the diameter of the plurality of holes can be more than 0 nanometer and less than or equal to 10 nanometers. The size of the plurality of cocatalysts can be less than the diameter of the plurality of holes. The plurality of cocatalysts in the cavity may be aggregated and its size may be more than the diameter of the plurality of holes. In a preferred embodiment, the size of the plurality of cocatalysts can be in a range of 15 nanometers to 50 nanometers.

Figure 10:
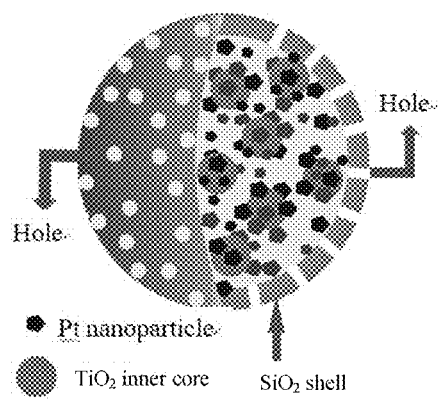
FIG. 10 is a model diagram of a composite photocatalyst of embodiment 2.

The nanomotor can include one inner core or more than one inner cores. As shown in FIG. 1, the nanomotor includes one inner core. As shown in FIG. 10, the nanomotor includes more than one inner cores separated from each other. A shape of the nanomotor is not limited. The shape of the nanomotor can be spherical, tubular, rod, linear, square, polygonal, acicular, three-dimensional, or irregular. The "irregular" shape means that the shape and size of the plurality of nanomotor are not limited.

The photocatalyst can be selected from the groups:

(1) metal oxides, such as $TiO_2$, $WO_3$, $Fe_3O_4$, $Bi_2O_3$, BiOBr, BiOI, $SnO_2$, $Nb_2O_5$, $Ta_2O_5$, etc.;

(2) metal nitrides, such as GaN, $Ta_3N_5$, TaON, $C_3N_4$, etc.;

(3) metal sulfides, such as CdS, PbS, $CuInS_2$, $AgInS_2$, $ZnIn_2S_4$, etc.;

(4) metal phosphides, such as GaP, etc.;

(5) metal carbides, such as SiC, etc.;

(6) other types of compounds and complexes, such as CdSe, CdTe, LaTiON, $AgMO_2$ (M=Al, Ga, In), and other complex oxides;

(7) acid salt: titanate, such as $SrTiO_3$; citrate, such as $Zn_2GeO_4$; citrate, such as $KCa_2Nb_3O_{10}$, $HCa_2Nb_3O_{10}$, $TiNbO_5$, etc.; vanadate, such as $BiVO_4$, $YVO_4$, etc.; tantalate, such as $NaTaO_3$; stibiate, such as $ZnSb_2O_6$; bismuthate, such as $CaBi_2O_4$; phosphate, such as $Ag_3PO_4$; molybdate; selenate; indiumate; chromate; stannate;

(8) a composite metal oxide including a $d^0$ and $d^{10}$ electronic configuration, such as $NiO_x/In_{1-x}Ni_x$, $TaO_4$, etc.;

(9) a series of Ag compounds, such as $Ag_2O$, AgCl, AgBr, AgI, $AgInZn_7S_9$, $\beta$-$AgAlO_2$, $\beta$-$AgGaO_2$, $\beta$-$AgInO_2$, $\alpha$-$AgAlO_2$, $\alpha$-$AgGaO_2$, $\alpha$-$AgInO_2$, $Ag_3PO_4$, $AgCrO_2$, $Ag_2CrO_4$, $AgAlO_2$, $AgNbO_3$, etc.;

(10) lanthanide, indium, such as $InVO_4$, $InNbO_4$, $InTaO_4$, $BiNbO_4$, $BiTaO_4$, etc.;

(11) oxide or sulfide complex, such as $Sm_2Ti_2S_2O_5$, $KCa_2Nb_3O_{10}$, $Ba_5Ta_4O_{15}$, $HCa_2Nb_3O_{10}$, etc.;

(12) a mutual doping complex selecting at least two of the above groups (1)~(11), such as $MoS_2$/CdS, CdS@CdSe/ZnO, $Fe_3O_4$/$WO_3$, TaON/$WO_3$, $SrTiO_3$/$BiVO_4$, etc.;

(13) a material selected from the above group (1)-(9) doping with a transition metal cation including a 3d transition metal, a noble metal, a rare-earth metal, such as Zn—Lu$_2$O$_3$/Ga$_2$O$_3$, Cr—Ba$_2$In$_2$O$_5$/In$_2$O$_3$, Cu$_2$O/WO$_3$, Pt/TiO$_2$, Au/TiO$_2$, etc.;

(14) a material selected from the above group (1)-(9) doping with anions, like C, N, P, S, F, such as N doped TiO$_2$.

In a preferred embodiment, the photocatalyst can be TiO$_2$. A shape of the photocatalyst can be granular, fusiform, rod, rhomboid, regular quadrilateral, dog bone or irregular.

A method for making a composite photocatalyst is provided. The method includes following steps:

S1, providing a nanomotor, wherein the nanomotor includes a shell formed by porous material, at least one inner core formed by a photocatalyst, and a cavity between the shell and the at least one inner core; and S2, forming a plurality of cocatalysts in the cavity, and part of the plurality of cocatalysts are located on outer surface of the photocatalyst.

In step S1, the porous material can be selected from silica porous material, glass porous material, and aluminum phosphate porous material. The photocatalyst is selected from the group consisting of TiO$_2$, WO$_3$, Fe$_3$O$_4$, Bi$_2$O$_3$, BiOBr, BiOI, SnO$_2$, Nb$_2$O$_5$, Ta$_2$O$_5$, CdSe, CdTe, GaN, Ta$_3$N$_5$, TaON, C$_3$N$_4$, CdS, PbS, CuInS$_2$, AgInS$_2$, ZnIn$_2$S$_4$, GaP, SiC, LaTiON, Sm$_2$Ti$_2$S$_2$O$_5$, titanate, germanate, niobate, vanadate, tantalate, antimonate, molybdate, selenate, indate, chromate, stannate, TaO$_4$, Ag$_2$O, AgCl, AgBr, AgI, AgInZn$_7$S$_9$, β-AgGaO$_2$, β-AgInO$_2$, α-AgGaO$_2$, α-AgInO$_2$, AgCrO$_2$, Ag$_2$CrO$_4$, AgAlO$_2$, AgNbO$_3$, InVO$_4$, InNbO$_4$, InTaO$_4$, BiNbO$_4$, BiTaO$_4$, anion/cation doped photocatalyst, solid solution photocatalyst, semiconductor composite photocatalyst, NaNbO$_3$—AgNbO$_3$, KCa$_2$Nb$_3$O$_{10}$, Ba$_5$Ta$_4$O$_{15}$, HCa$_2$Nb$_3$O$_{10}$, and any combination thereof.

In a preferred embodiment, the nanomotor can include a titanium dioxide inner core and a porous silica shell. The nanomotor can be prepared by following steps: 1) providing a titanium dioxide inner core; 2) sequentially coating a carbon layer and a titanium dioxide layer on the titanium dioxide inner core, to obtain TiO$_2$@C@SiO$_2$ core-shell structure; 3) removing the carbon layer of the TiO$_2$@C@SiO$_2$ core-shell structure, to obtaining a nanomotor of TiO$_2$@@SiO$_2$ core-shell structure. The titanium dioxide inner core may be prepared by a sol-gel method, a hydrothermal method or an alcohol thermal method. The carbon layer may be prepared by a hydrothermal method or an alcohol thermal method. The silica layer may be prepared by a sol-gel method. The method for removing the carbon layer of the TiO$_2$@C@SiO$_2$ core-shell structure can be selected from a high-temperature calcination method, an ultraviolet light etching method, and a chemical wet etching method.

In step S2, the method of forming the plurality of cocatalysts depends on the type of the plurality of cocatalysts.

When the plurality of cocatalysts include metal nanoparticles, the plurality of cocatalysts can be formed via following steps:

S211, providing a cocatalyst precursor mixture comprising a cocatalyst precursor;

S212, immersing the nanomotor in the cocatalyst precursor mixture, making the cocatalyst precursor mixture enter the cavity, and obtaining a first mixture; and S213, irradiating the first mixture with light, and making the cocatalyst precursor reacting to obtain the plurality of cocatalysts.

In step S211, the promoter precursor can be any precursor material that can form metal oxide nanoparticles, especially precursor materials that can be reacted under light. In a preferred embodiment, the cocatalyst precursor can include at least one of chloroplatinic acid, chloroauric acid, chloropalladic acid, and silver nitrate. The cocatalyst precursor can be prepared by mixing the cocatalyst precursor with a first organic solvent. The first organic solvent is selected from the group consisting of methanol, ethanol, formic acid, triethanolamine, triethylamine, acetonitrile, and any combination thereof.

In step S212, when the nanomotor is immersed in the cocatalyst precursor mixture, a concentration difference of the cocatalyst precursor exists between the inside of the porous material and the outside and because the porous material has hydrophilic property, the cocatalyst precursor will enter the cavity of the nanomotor via the plurality of holes, achieving a concentration balance.

In step S213, when the first mixture is irradiated with light, a in-situ photochemical reduction reaction can undergo on the cocatalyst precursor to form the plurality of cocatalysts. The light that irradiating the first mixture can be selected from ultraviolet light, infrared light, and visible light.

When ultraviolet light irradiates the first mixture, a plurality of electron-hole pairs can be generated on the surface of the photocatalyst inner core. As a high-efficiency pore trapping agent, the first organic solvent rapidly can capture positive holes of the plurality of electron-hole pairs, and the electrons of the plurality of electron-hole pairs can be transferred to metal ion in the cocatalyst precursor, causing the cocatalyst precursor to be photochemically reduced in situ on the surface of the photocatalyst inner core. Then, the electrons of the plurality of electron-hole pairs and the H$^+$ proton combines on surface of the photocatalyst inner core and H$_2$ is generated. The continuous consumption of the first organic solvent in the porous material causes a concentration gradient of the first organic solvent between the inside and outside of the nanomotor. And the cocatalyst precursor is pushed into the cavity through the plurality of holes. Of course, the cocatalyst precursor outside the porous material can generate part of the plurality of cocatalysts under irradiation of light, and the part of the plurality of cocatalysts will be pushed into the nanocavity through the plurality of holes. The composite photocatalyst having a core-shell nanomotor-cocatalyst synergistic structure can be prepared, and the composite photocatalyst has a high photocatalytic activity. Thus, the function of the nanomotor can be not only to provide a reaction space, but also to introduce the cocatalyst into the cavity, which is also a necessary condition for the formation of the cocatalysts with a specific three-dimensional shape.

The step of removing the oxygen in the promoter precursor by nitrogen or inert gas aeration may also be included prior to irradiating the promoter precursor with light.

The plurality of cocatalysts can have crystalline or dendritic shape.

When the plurality of cocatalysts include at least one of the metal oxide nanoparticles, the metal sulfide nanoparticles, the phosphate nanoparticles, and the up-conversion material nanoparticles, the plurality of cocatalysts can be prepared via following steps:

S221, providing the plurality of cocatalysts;

S222, dispersing the plurality of cocatalysts in water and obtaining cocatalyst solution;

S223, dispersing the cocatalyst solution in a second organic solvent and obtaining a second mixture;

S224, immersing the nanomotor in the second mixture and making the plurality of cocatalysts enter the cavity.

In step of S222, in order to make the pluralilty of cocatalysts better dispersed, a dispersant, a surfactant, etc. can be added in the cocatalyst solution.

In step of S223, the second organic solvent can be selected from the group consisting of methanol, ethanol, formic acid, triethanolamine, triethylamine, acetonitrile, and any combination thereof.

Figure 13:
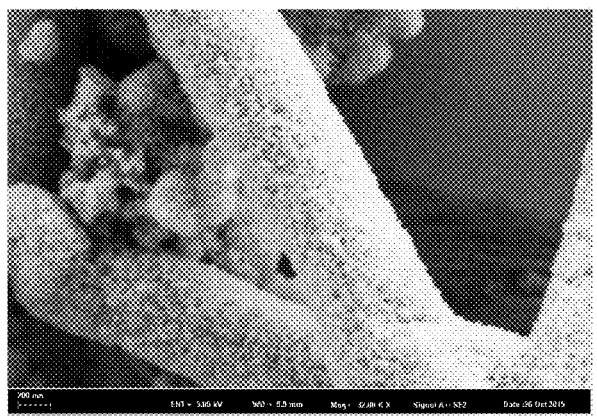
FIG. 13 is a scanning electron micrograph of a composite photocatalyst of embodiment 5.
Figure 14:
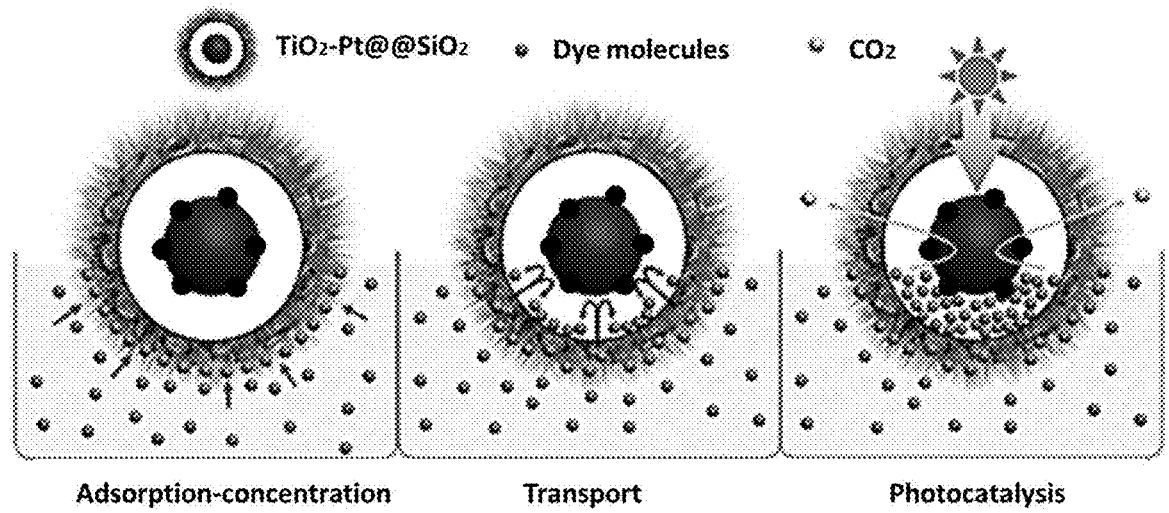
FIG. 14 is a model diagram of a process of the composite photocatalyst degrading organic pollutes.

When the composite photocatalyst is used to degrade organic pollutants such as dye, under the illumination of light, the organic pollutants in the cavity of the composite photocatalyst are continuously degraded (as shown in FIG. 13), thereby forming an internal/external concentration gradient of the organic pollutants, causing the external organic pollutants to enter the cavity via the plurality of holes. The rate of degradation of organic pollutes is accelerated. In the process of degrading the organic pollutes, $CO_2$ can be obtained and diffuse to the outside through the plurality of holes.

Further explanation will be given below through various embodiments.

Embodiment 1

Figure 2:
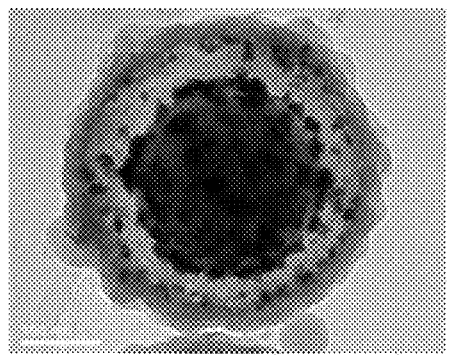
FIG. 2 is a transmission electron micrograph of the composite photocatalyst of FIG. 1.

Referring to FIGS. 1 and 2, a composite photocatalyst is provided. The composite photocatalyst includes a spherical core-shell nanomotor and Pt nanodendrites dispersed in the nanomotor. And the nanomotor includes a single $TiO_2$ inner core, a porous $SiO_2$ shell encasing the $TiO_2$ inner core, and a cavity between the $SiO_2$ shell and the $TiO_2$ inner core. The Pt nanodendrites are dispersed in the cavity. The $SiO_2$ shell is a hollow structure and includes a plurality of holes. The diameter of the plurality of holes is about 4 nm.

Figure 3:
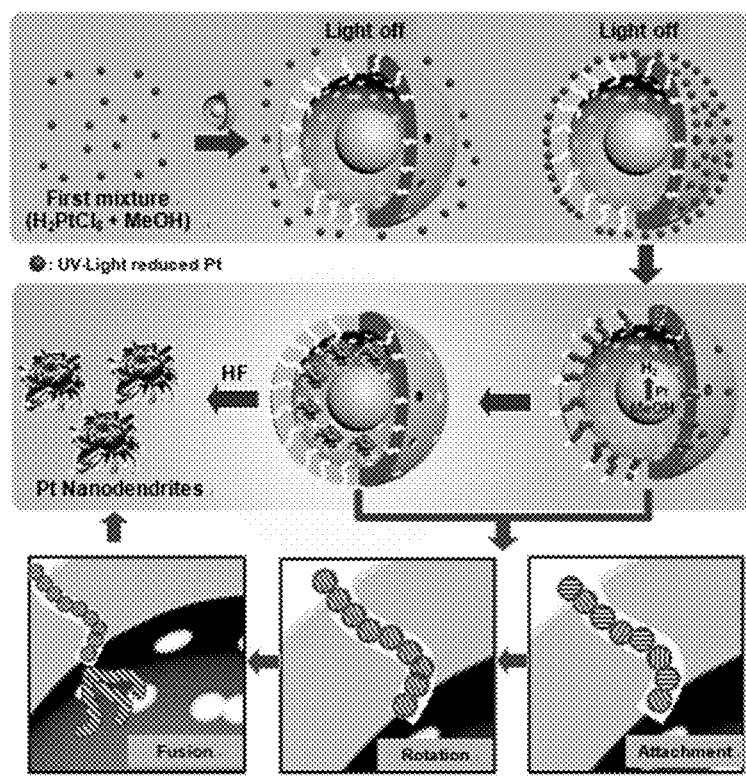
FIG. 3 is a model diagram of a process for making the composite photocatalyst of FIG. 1.
Figure 4D:
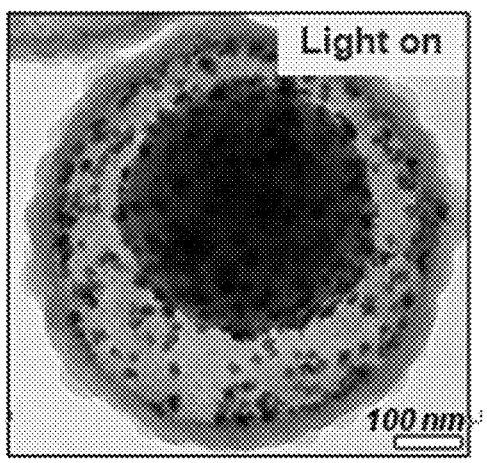
FIG. 4D is a transmission electron micrograph of the composite photocatalyst obtained after irradiating the first mixture of FIG. 4A with UV light for about 1 hour.
Figure 4E:
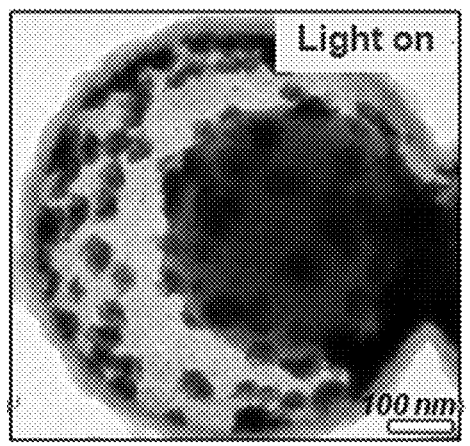
FIG. 4E is a transmission electron micrograph of the composite photocatalyst obtained after irradiating the first mixture of FIG. 4A with UV light for about 3 hours.
Figure 4F:
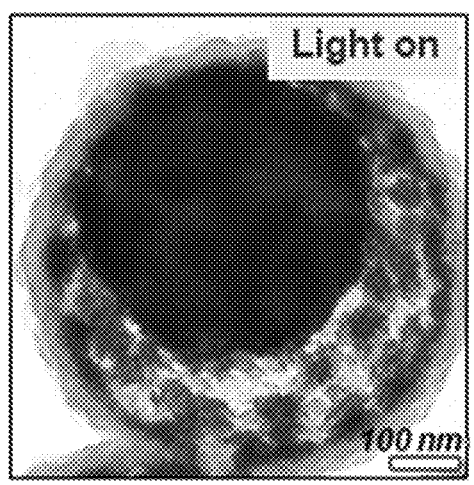
FIG. 4F is a transmission electron micrograph of the composite photocatalyst obtained after irradiating the first mixture of FIG. 4A with UV light for about 5 hours.
Figure 5A:
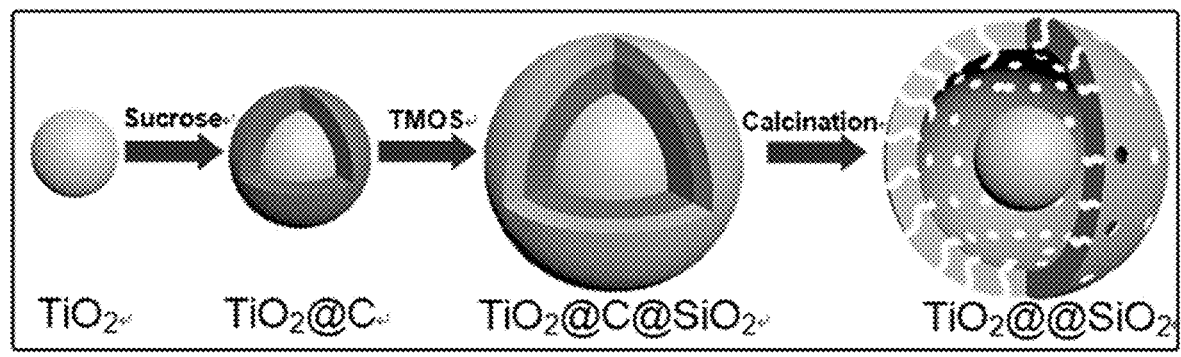
FIG. 5A is a model diagram of a process for making the nanomotor of embodiment 1.
Figure 5B:
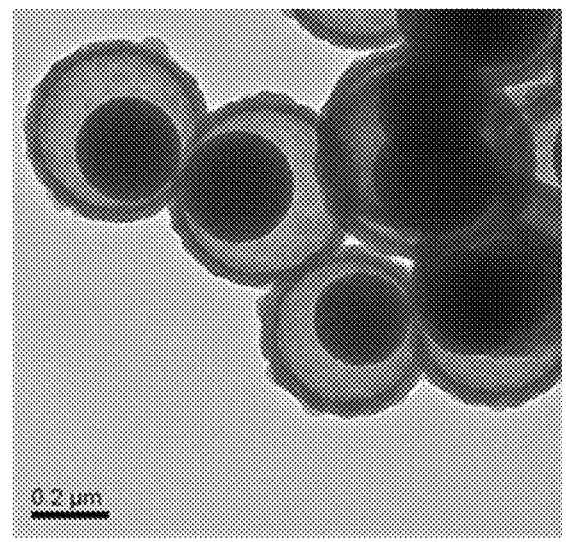
FIG. 5B is a transmission electron micrograph of the nanomotor of embodiment 1.

Referring to FIG. 3, a method for making the composite photocatalyst is provided. The method includes following steps:
(1) preparing the nanomotor by following steps (a) to (d), as shown in FIGS. 5A and 5B:
(a) pretreating $TiO_2$ nanoparticles: adding titanium dioxide nanoparticle of about 300 mg to a NaOH solution with a molar concentration of about 0.8 mol/L; after magnetic stirring treatment at about 800 round per minute for about 10 hours, and 4 times of water washing-centrifugal separation, obtaining $TiO_2$ nanoparticles;
(b) preparing $TiO_2$@C structure (labeled as "$TiO_2$@C" in FIG. 5A): adding the $TiO_2$ nanoparticle of about 250 mg to a sucrose solution having a molar concentration of about 1.5 mol/L, to obtain a mixture; then after mixing, introducing the mixture into a hydrothermal reaction vessel, and heat-treating at about 150 degree centigrades to about 200 degree centigrades for about 5 hours; after the heat-treating process, washing the mixture with a methanol solution for about 5 times, distilled water for about 5 times, and then drying, to obtain the $TiO_2$@C structure, wherein the $TiO_2$@C structure includes a C layer and a single $TiO_2$ inner core in the C layer;
(c) preparing $TiO_2$@C@$SiO_2$ structure (labeled as "$TiO_2$@C@$SiO_2$" in FIG. 5A) via following steps:
(i) mixing the $TiO_2$@C structure of about 300 mg with chloroform of 10 mL, ultrapure water of 0.5 mL, and acetone of about 5 mL and stirring for 3 hours;
(ii) dissolving methyl orthosilicate of about 1 g in absolute ethanol solution of about 15 mL, and stirring for 3 hours;
(iii) adding a mixture obtained by step (ii) to a mixture obtained by step (i), and then stirring for about 5 hours;
(iv) drying a mixture obtained by step (iii) at about 100 degree centigrades to about 120 degree centigrades for 4 hours and grinding;
(d) removing the C layer and obtaining the nanomotor (labeled as "$TiO_2$@@$SiO_2$" in FIG. 5A): heating the $TiO_2$@C@$SiO_2$ structure in a muffle furnace at about 400 degree centigrades to about 600 degree centigrades for about 5.5 hours, and grinding;
(2) preparing a Pt precursor mixture: mixing chloroplatinic acid and methanol solution and obtaining a Pt precursor mixture with a molar concentration of about $10^{-6}$ mol/L, then aerating with $N_2$ for 15 minutes to remove oxygen;
(3) preparing a first mixture: immersing the nanomotor in the Pt precursor mixture, making the Pt precursor mixture enter the cavity of the nanomotor through the plurality of holes;
(4) irradiating the first mixture with UV light, and making chloroplatinic acid being reduced to obtain a plurality of Pt nanoparticles with a diameter of about 2 nm (as shown in FIGS. 4A to 4F). As shown in FIGS. 4D to 4F, the Pt nanoparticles are isotropic, adsorbed and aggregated on the $TiO_2$ inner core, in the cavity, and on the inner surface of the porous $SiO_2$ shell to form Pt nanodendrites after irradiating the first mixture with UV light for several of hours. Specifically, when UV light irradiates the first mixture, a plurality of electron-hole pairs can be generated on the surface of the $TiO_2$ inner core. As a high-efficiency pore trapping agent, the methanol solvent rapidly can capture positive holes of the plurality of electron-hole pairs, and the electrons of the plurality of electron-hole pairs can be transferred to Pt ion of the chloroplatinic acid, causing the Pt nanoparticles aggregating in situ on the surface of the $TiO_2$ inner core. Then, the electrons of the plurality of electron-hole pairs and the $H^+$ proton combines on surface of the $TiO_2$ inner core and $H_2$ is generated. The continuous consumption of the methanol in the cavity causes a concentration gradient of the methanol between the inside and outside of the nanomotor. And the chloroplatinic acid is pushed into the cavity through the plurality of holes to promote the forming of Pt nanodendrites.

Figure 7:
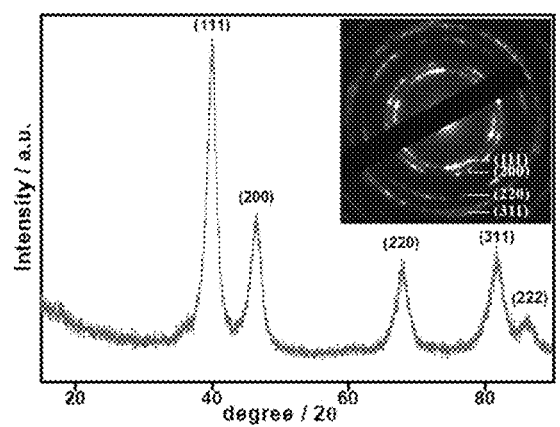
FIG. 7 is a X-ray diffraction pattern of the plurality of cocatalysts of the composite photocatalyst of embodiment 1.
Figure 8:
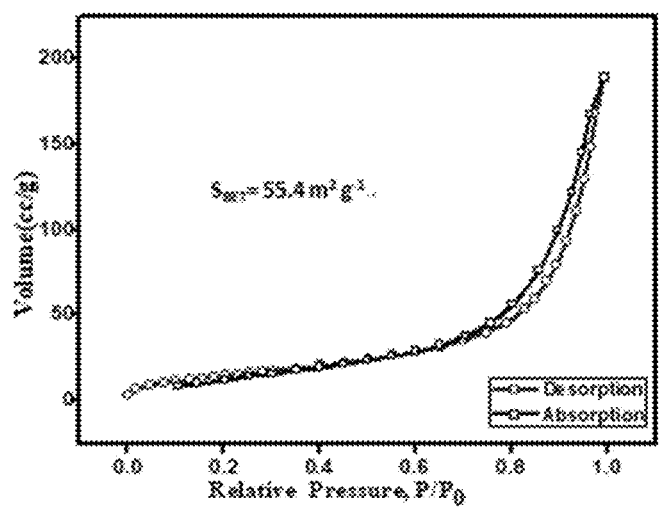
FIG. 8 is a specific surface area measurement pattern of the nanomotor of the composite photocatalyst of embodiment 1.

As shown in FIG. 7, the plurality of cocatalyst nanoparticle of a preferred embodiment has a good crystallinity. As shown in FIG. 8, the nanomotor of the composite photocatalyst is proved to having the cavity.

Catalytic Performance Test

Figure 9:
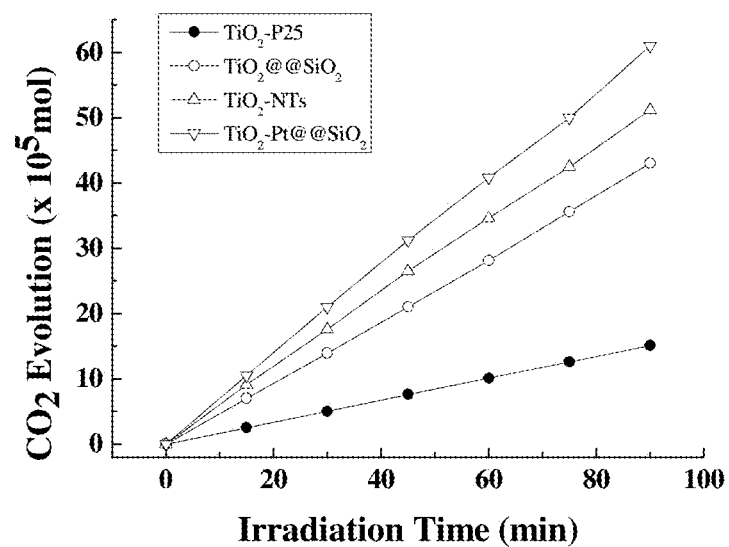
FIG. 9 is relationship curves between amount of $CO_2$ evolution and UV irradiation time when four different photocatalysts degrade acetic acid (wherein "$TiO_2$—P25" is the $TiO_2$ P25, "$TiO_2$@@$SiO_2$" is the nanomotor, "$TiO_2$-NTs" is $TiO_2$ nanotubes, "$TiO_2$—Pt@@$SiO_2$" is the composite photocatalyst prepared by embodiment 1).

The composite photocatalyst prepared by embodiment 1 is labeled as "$TiO_2$—Pt@@$SiO_2$" in FIG. 9. Under the same conditions, the composite photocatalyst prepared by embodiment 1, the nanomotor ($TiO_2$@@$SiO_2$), $TiO_2$ P25 (labeled as "$TiO_2$—P25" in FIG. 9) and $TiO_2$ nanotubes (labeled as "$TiO_2$-NTs" in FIG. 9) were respectively immersed in the same concentration of acetic acid solution, and $CO_2$ were evolving. The relationship between the amount of $CO_2$ evolution and the UV irradiation time was measured, as shown in FIG. 9. Referring to FIG. 9, under the same conditions, the amount of $CO_2$ evolution of the composite photocatalyst prepared by embodiment 1 was the highest and almost four times to that of the $TiO_2$ P25. It was also fully proved that the composite photocatalyst had high photocatalytic activity, and its catalytic activity is obviously improved to a large extent with respect to the nanomotor and the $TiO_2$ nanotubes as shown in FIG. 9.

The composite photocatalyst prepared by embodiment 1 has high photocatalytic activity, and the main reason is as follows: the composite photocatalyst includes Pt nanoparticles and the nanomotor forming a photocatalytic synergistic reaction system. The role of Pt nanoparticles has two aspects: one is to affect the energy band structure of $TiO_2$ inner core of the nanomotor, and the other is to affect the redox reaction process.

Pt and $TiO_2$ have different Fermi energy levels, and the work function of Pt is higher than that of $TiO_2$. When the Pt nanoparticles contacts with $TiO_2$ inner core of the nanomotor, photo-generated electrons are transferred from the $TiO_2$ inner core with high Fermi level to Pt nanoparticles with low Fermi level until the two Fermi levels match. In the space charge layer formed by the Pt nanoparticles and $TiO_2$ inner core, the surface of the Pt nanoparticles obtains an excessive negative charge, and the surface of the $TiO_2$ inner core exhibits an excessive positive charge, thereby causing the band to bend upward to form a Schottky barrier, which can effectively act as an electron trap for inhibiting recombination of electrons and holes.

After introducing Pt nanoparticles, the Pt nanoparticles acts as a receiver for photo-generated electrons, which promotes the transport of interfacial carriers. The photo-generated electrons are separated from photo-generated holes, and undergo redox reaction with organic pollutes adsorbed on the surface of $TiO_2$ inner core, or trapped by the surface lattice defects, so that photo-generated electrons accumulate on the surface of Pt nanoparticles, and the holes remain on the surface of $TiO_2$ inner core, which reduces the recombination rate of photo-generated electron and photo-generated holes and improves the photo-catalytic activity of the composite photocatalyst.

Embodiment 2

Referring to FIG. 10, a composite photocatalyst is provided. The composite photocatalyst includes a spherical core-shell nanomotor and Pt nanodendrites dispersed in the nanomotor. And the nanomotor includes a plurality of $TiO_2$ inner cores, a porous $SiO_2$ shell encasing the $TiO_2$ inner cores, and a cavity between the $SiO_2$ shell and the $TiO_2$ inner cores. The Pt nanodendrites are dispersed in the cavity. The difference between the composite photocatalyst of embodiment 2 and that of embodiment 1 is that the nanomotor includes the plurality of $TiO_2$ inner cores Pt nanodendrites.

Figure 11:
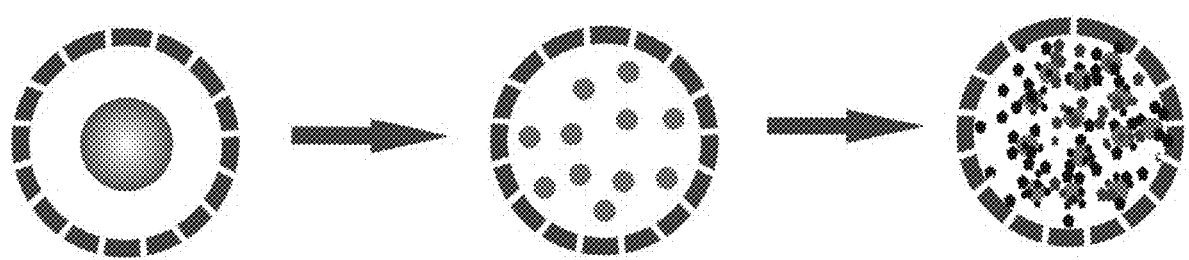
FIG. 11 is a model diagram of a process for making the composite photocatalyst of FIG. 10.

Referring to FIG. 11, a method for making the composite photocatalyst is provided. The method of making the composite photocatalyst of embodiment 2 is the same as the method of making the composite photocatalyst of embodiment 1, except preparing the nanomotor including the plurality of $TiO_2$ inner cores. The method for preparing the nanomotor by following steps (a') to (d'):

(a') pretreating $TiO_2$ nanoparticles;
(b') preparing $TiO_2$@C structure, wherein the $TiO_2$@C structure includes a C layer and a plurality of $TiO_2$ inner cores in the C layer;
(c') preparing $TiO_2$@ C @ $SiO_2$ structure;
(d') removing the C layer and obtaining the nanomotor.

Embodiment 3

A composite photocatalyst is provided. The composite photocatalyst includes a tubular core-shell nanomotor and Pd nanoparticles dispersed in the nanomotor. And the nanomotor includes a $TiO_2$ inner core, a porous $SiO_2$ shell encasing the $TiO_2$ inner core, and a cavity between the $SiO_2$ shell and the $TiO_2$ inner core. The Pd nanoparticles are dispersed in the cavity. The difference between the composite photocatalyst of embodiment 3 and that of embodiment 1 is that the tubular core-shell nanomotor and Pd nanoparticles.

A method for making the composite photocatalyst is provided. The method of making the composite photocatalyst of embodiment 3 is the same as the method of making the composite photocatalyst of embodiment 1, except making the tubular core-shell nanomotor and Pd precursor mixture, and the Pd precursor mixture includes chloropalladic acid.

Embodiment 4

Figure 12:
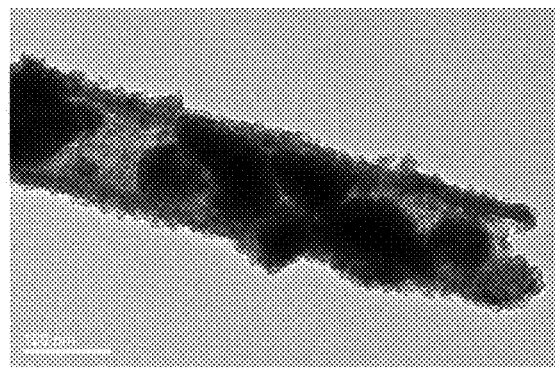
FIG. 12 is a transmission electron micrograph of a composite photocatalyst of embodiment 4.

Referring to FIG. 12, a composite photocatalyst is provided. The composite photocatalyst includes a rodlike core-shell nanomotor and Ag nanodendrites dispersed in the nanomotor. And the nanomotor includes a $TiO_2$ inner core, a porous $SiO_2$ shell encasing the $TiO_2$ inner core, and a cavity between the $SiO_2$ shell and the $TiO_2$ inner core. The Ag nanodendrites are dispersed in the cavity. The difference between the composite photocatalyst of embodiment 4 and that of embodiment 1 is that the rodlike core-shell nanomotor and Ag nanodendrites.

A method for making the composite photocatalyst is provided. The method of making the composite photocatalyst of embodiment 4 is the same as the method of making the composite photocatalyst of embodiment 1, except preparing the rodlike core-shell nanomotor and Ag precursor mixture, and the Ag precursor mixture includes silver nitrate.

Embodiment 5

Referring to FIG. 13, a composite photocatalyst is provided. The composite photocatalyst includes a linear core-shell nanomotor and Au nanodendrites dispersed in the nanomotor. And the nanomotor includes a $TiO_2$ inner core, a porous $SiO_2$ shell encasing the $TiO_2$ inner core, and a cavity between the $SiO_2$ shell and the $TiO_2$ inner core. The Au nanodendrites are dispersed in the cavity. The difference between the composite photocatalyst of embodiment 4 and that of embodiment 1 is that the linear core-shell nanomotor and Au nanodendrites.

A method for making the composite photocatalyst is provided. The method of making the composite photocatalyst of embodiment 5 is the same as the method of making the composite photocatalyst of embodiment 1, except preparing the linear core-shell nanomotor and Au precursor mixture, and the Au precursor mixture includes chloroauric acid.

Embodiment 6

A composite photocatalyst is provided. The composite photocatalyst includes a spherical core-shell nanomotor and Pt nanoparticles dispersed in the nanomotor. And the nanomotor includes a $TiO_2$ inner core, a porous $SiO_2$ shell encasing the $TiO_2$ inner core, and a cavity between the $SiO_2$ shell and the $TiO_2$ inner core. The Pt nanoparticles are dispersed in the cavity. The difference between the composite photocatalyst of embodiment 6 and that of embodiment 1 is that the Pt nanoparticles.

A method for making the composite photocatalyst is provided. The method of making the composite photocatalyst of embodiment 6 is the same as the method of making the composite photocatalyst of embodiment 1, except preparing Pt nanoparticles, and the nanomotor is pre-prepared.

Embodiment 7

A composite photocatalyst is provided. The composite photocatalyst includes a spherical core-shell nanomotor and Pt nanoparticles dispersed in the nanomotor. And the nanomotor includes a plurality of N doped $TiO_2$ inner cores, a porous $SiO_2$ shell encasing the N doped $TiO_2$ inner cores, and a cavity between the $SiO_2$ shell and the N doped $TiO_2$ inner cores. The Pt nanoparticles are dispersed in the cavity. The difference between the composite photocatalyst of embodiment 7 and that of embodiment 2 is that the N doped $TiO_2$ inner cores.

Embodiment 8

A composite photocatalyst is provided. The composite photocatalyst includes a spherical core-shell nanomotor and $MoS_2$ nanoparticles dispersed in the nanomotor. And the nanomotor includes a pluraility of CdS inner cores, a porous $SiO_2$ shell encasing the CdS inner core, and a cavity between the $SiO_2$ shell and the CdS inner cores. The $MoS_2$ nanoparticles are dispersed in the cavity. The difference between the composite photocatalyst of embodiment 7 and that of embodiment 2 is that the CdS inner cores and $MoS_2$ nanoparticles. The mass of the $MoS_2$ nanoparticles is about 1% to 5% of that of the CdS inner cores.

A method for making the composite photocatalyst is provided. The method of making the composite photocatalyst of embodiment 8 is the same as the method of making the composite photocatalyst of embodiment 1, except preparing $MoS_2$ mixture: $MoS_2$ with a diameter of about 2 nanometers to 5 nanometers is pre-prepared and mixed with triethylamine.

Embodiment 9

A composite photocatalyst is provided. The composite photocatalyst includes a spherical core-shell nanomotor and Yb, Er doped $NaYF_4$ nanoparticles dispersed in the nanomotor. And the nanomotor includes a $TiO_2$ inner core, a porous $SiO_2$ shell encasing the $TiO_2$ inner core, and a cavity between the $SiO_2$ shell and the $TiO_2$ inner core. The Yb, Er doped $NaYF_4$ nanoparticles are dispersed in the cavity. The difference between the composite photocatalyst of embodiment 9 and that of embodiment 1 is that the Yb, Er doped $NaYF_4$ nanoparticles.

A method for making the composite photocatalyst is provided. The method of making the composite photocatalyst of embodiment 9 is the same as the method of making the composite photocatalyst of embodiment 8, except preparing Yb, Er doped $NaYF_4$ mixture: the Yb, Er doped $NaYF_4$ nanoparticles is pre-prepared.

Embodiment 10

A composite photocatalyst is provided. The composite photocatalyst includes a spherical core-shell nanomotor and Tm doped $NaGdF_4$ nanoparticles dispersed in the nanomotor. And the nanomotor includes a $TiO_2$ inner core, a porous $SiO_2$ shell encasing the $TiO_2$ inner core, and a cavity between the $SiO_2$ shell and the $TiO_2$ inner core. The Tm doped $NaGdF_4$ nanoparticles are dispersed in the cavity. The difference between the composite photocatalyst of embodiment 10 and that of embodiment 9 is that the Tm doped $NaGdF_4$ nanoparticles.

A method for making the composite photocatalyst is provided. The method of making the composite photocatalyst of embodiment 10 is the same as the method of making the composite photocatalyst of embodiment 9, except preparing Tm doped $NaGdF_4$ mixture: the Tm doped $NaGdF_4$ nanoparticles is pre-prepared.

Figure 15:
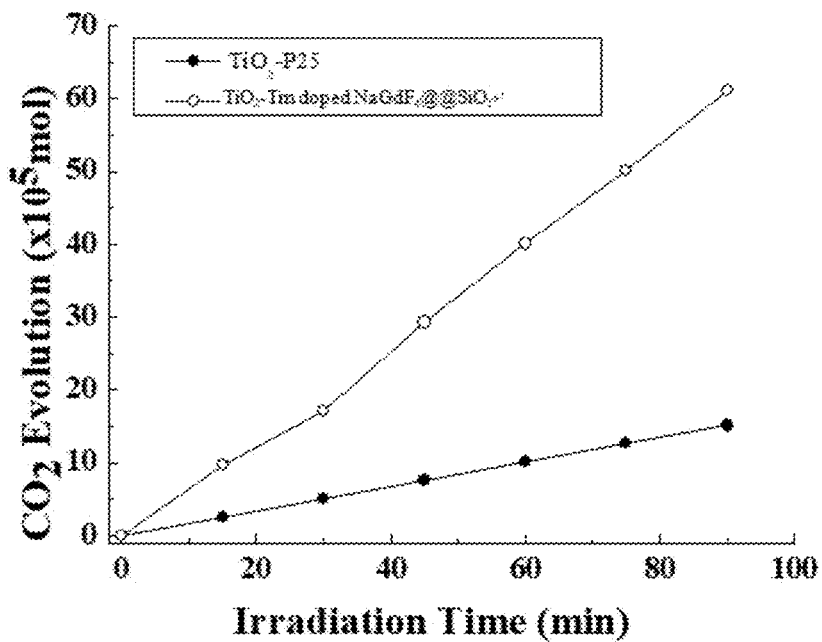
FIG. 15 is relationship curves between $CO_2$ evolution and UV irradiation time when two photocatalysts degrade acetic acid (wherein "$TiO_2$—P25" is the $TiO_2$ P25, "$TiO_2$—Tm doped $NaGdF_4$@@$SiO_2$" is the composite photocatalyst prepared by embodiment 10).

The composite photocatalyst prepared by embodiment 10 was taken in a catalytic performance test as embodiment 1. As shown in FIG. 15, the catalytic activity of the composite photocatalyst prepared by embodiment 10 (labeled as "$TiO_2$—Tm doped $NaGdF_4@@SiO_2$") is obviously improved to a large extent with respect to the $TiO_2$ P25 (labeled as "$TiO_2$—P25") as shown in FIG. 15.

Embodiment 11

A composite photocatalyst is provided. The composite photocatalyst includes a spherical core-shell nanomotor and Ho doped $NaGdF_4$ nanoparticles dispersed in the nanomotor. And the nanomotor includes a $TiO_2$ inner core, a porous $SiO_2$ shell encasing the $TiO_2$ inner core, and a cavity between the $SiO_2$ shell and the $TiO_2$ inner core. The Ho doped $NaGdF_4$ nanoparticles are dispersed in the cavity. The difference between the composite photocatalyst of embodiment 10 and that of embodiment 9 is that the Tm doped $NaGdF_4$ nanoparticles.

A method for making the composite photocatalyst is provided. The method of making the composite photocatalyst of embodiment 11 is the same as the method of making the composite photocatalyst of embodiment 9, except preparing Ho doped $NaGdF_4$ mixture: the Ho doped $NaGdF_4$ nanoparticles is pre-prepared.

Figure 16:
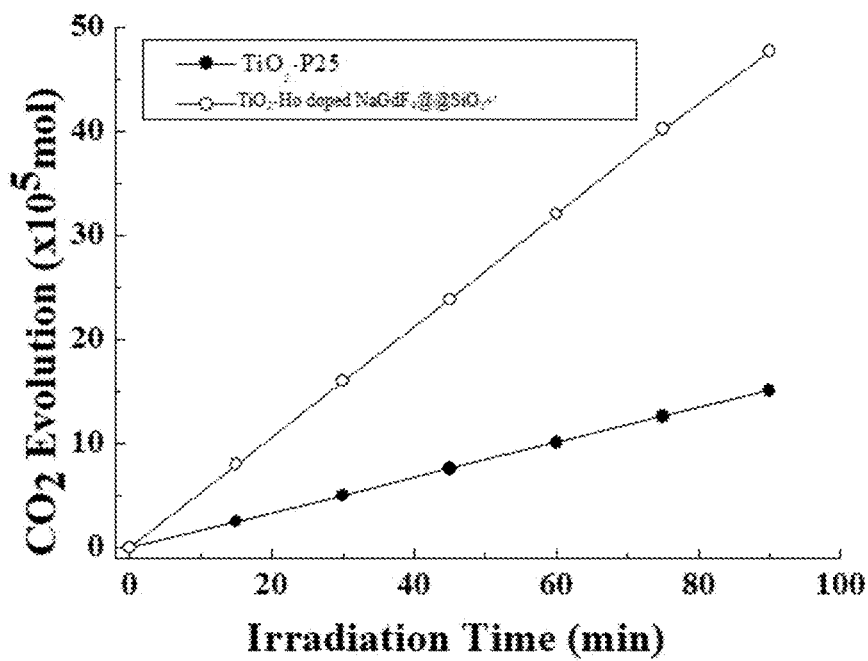
FIG. 16 is relationship curves between $CO_2$ evolution and UV irradiation time when two photocatalysts degrade acetic acid (wherein "$TiO_2$—P25" is the $TiO_2$ P25, "$TiO_2$—Ho doped $NaGdF_4$@@$SiO_2$" is the composite photocatalyst prepared by embodiment 11).

The composite photocatalyst prepared by embodiment 11 was taken in a catalytic performance test as embodiment 1. As shown in FIG. 16, the catalytic activity of the composite photocatalyst prepared by embodiment 11 (labeled as "$TiO_2$—Ho doped $NaGdF_4@@SiO_2$") is obviously improved to a large extent with respect to the $TiO_2$ P25 (labeled as "$TiO_2$—P25") as shown in FIG. 16.

Embodiment 12

A composite photocatalyst is provided. The composite photocatalyst includes a spherical core-shell nanomotor and $Ag_3PO_4$ nanoparticles dispersed in the nanomotor. And the nanomotor includes a $TiO_2$ inner core, a porous $SiO_2$ shell encasing the $TiO_2$ inner core, and a cavity between the $SiO_2$ shell and the $TiO_2$ inner core. The $Ag_3PO_4$ nanoparticles are dispersed in the cavity. The difference between the composite photocatalyst of embodiment 12 and that of embodiment 2 is that the $Ag_3PO_4$ nanoparticles.

A method for making the composite photocatalyst is provided. The method of making the composite photocatalyst of embodiment 12 is the same as the method of making the composite photocatalyst of embodiment 9, except preparing $Ag_3PO_4$ mixture: the $Ag_3PO_4$ nanoparticles is pre-prepared.

The description above is merely exemplary embodiments of the present disclosure, but is not intended to limit the disclosure. Any modifications, substitutions, or improvements made without departing from the spirits and scope of the disclosure shall all fall within the protection of the disclosure.

What is claimed is:

1. A composite photocatalyst, wherein the composite photocatalyst comprises a nanomotor and a plurality of cocatalysts, the nanomotor comprises a shell formed by porous material, at least one inner core formed by a photocatalyst, and a cavity between the shell and the at least one inner core, the plurality of cocatalysts are located in the cavity, the plurality of cocatalysts are selected from the group consisting of metal nanoparticles, metal oxide nanoparticles, metal sulfide nanoparticles, phosphate nanoparticles, up-conversion material nanoparticles, and any combination thereof.

2. The composite photocatalyst of claim 1, wherein part of the plurality of cocatalysts are located on outer surface of the at least one inner core.

3. The composite photocatalyst of claim 1, wherein the plurality of cocatalysts have crystalline or dendritic shape.

4. The composite photocatalyst of claim 1, wherein the metal nanoparticles are selected from the group consisting of platinum nanoparticles, gold nanoparticles, palladium nanoparticles, silver nanoparticles, and any combination thereof; the metal oxide nanoparticles are selected from the group consisting of zinc oxide nanoparticles, copper oxide nanoparticles, manganese oxide nanoparticles, nickel oxide nanoparticles, cobalt oxide nanoparticles, iron oxide nanoparticles, molybdenum oxide nanoparticles, cerium oxide nanoparticles, cerium oxide nanoparticles, cerium oxide nanoparticles, and any combination thereof; the metal sulfide nanoparticles are selected from the group consisting of $MoS_2$ nanoparticles, ZnS nanoparticles, CuS nanoparticles, NiS nanoparticles, CoS nanoparticles, and any combination thereof; the phosphate nanoparticles are selected from the group consisting of $Ag_3PO_4$ nanoparticles, $LaPO_4$ nanoparticles, $BiPO_4$ nanoparticles, and any combination thereof; and the up-conversion material nanoparticles comprises rare-earth ion doped compounds.

5. The composite photocatalyst of claim 1, wherein the porous material comprises silica porous material, glass porous material, and aluminum phosphate porous material.

6. The composite photocatalyst of claim 1, wherein the porous material comprises a plurality of holes, a diameter of the plurality of holes is less than a size of the at least one inner core.

7. The composite photocatalyst of claim 6, wherein the diameter of the plurality of holes is less than approximately 10 nanometers.

8. The composite photocatalyst of claim 1, wherein the at least one inner core is selected from the group consisting of $TiO_2$, $WO_3$, $Fe_3O_4$, $Bi_2O_3$, BiOBr, BiOI, $SnO_2$, $Nb_2O_5$, $Ta_2O_5$, CdSe, CdTe, GaN, $Ta_3N_5$, TaON, $C_3N_4$, CdS, PbS, $CuInS_2$, $AgInS_2$, $ZnIn_2S_4$, GaP, SiC, LaTiON, $Sm_2Ti_2S_2O_5$, titanate, germanate, niobate, vanadate, tantalate, antimonate, molybdate, selenate, indate, chromate, stannate, $TaO_4$, $Ag_2O$, AgCl, AgBr, AgI, $AgInZn_7S_9$, $\beta$-$AgGaO_2$, $\beta$-$AgInO_2$, $\alpha$-$AgGaO_2$, $\alpha$-$AgInO_2$, $AgCrO_2$, $Ag_2CrO_4$, $AgAlO_2$, $AgNbO_3$, $InVO_4$, $InNbO_4$, $InTaO_4$, $BiNbO_4$, $BiTaO_4$, anion/cation doped photocatalyst, solid solution photocatalyst, semiconductor composite photocatalyst, $NaNbO_3$-$AgNbO_3$, $KCa_2Nb_3O_{10}$, $Ba_5Ta_4O_{15}$, $HCa_2Nb_3O_{10}$, and any combination thereof.

9. A method for making a composite photocatalyst, wherein comprises steps of:
providing a nanomotor, wherein the nanomotor comprises a shell formed by porous material, at least one inner core formed by a photocatalyst, and a cavity between the shell and the at least one inner core; and forming a plurality of cocatalysts in the cavity, and part of the plurality of cocatalysts are located on outer surface of the at least one inner core, wherein the plurality of cocatalysts are selected from the group consisting of metal nanoparticles, metal oxide nanoparticles, metal sulfide nanoparticles, phosphate nanoparticles, up-conversion material nanoparticles, and any combination thereof.

10. The method of claim 9, wherein the step of forming the plurality of cocatalysts in the cavity is as follows:
providing a cocatalyst precursor mixture comprising a cocatalyst precursor;
immersing the nanomotor in the cocatalyst precursor mixture, making the cocatalyst precursor mixture enter the cavity, and obtaining a first mixture; and
irradiating the first mixture with light, and making the cocatalyst precursor reacting to obtain the plurality of cocatalysts, wherein the plurality of cocatalysts comprises the metal nanoparticles.

11. The method of claim 10, wherein in the step of irradiating the first mixture with light, a in-situ photochemical reduction reaction undergoes on the cocatalyst precursor to form the plurality of cocatalysts.

12. The method of claim 10, wherein the plurality of cocatalysts have crystalline or dendritic shape.

13. The method of claim 10, wherein the cocatalyst precursor comprises at least one of chloroplatinic acid, chloroauric acid, chloropalladic acid, and silver nitrate.

14. The method of claim 10, wherein the cocatalyst precursor mixture is prepared by mixing the cocatalyst precursor with a first organic solvent.

15. The method of claim 14, wherein the first organic solvent is selected from the group consisting of methanol, ethanol, formic acid, triethanolamine, triethylamine, acetonitrile, and any combination thereof.

16. The method of claim 9, wherein the step of forming the plurality of cocatalysts in the cavity is as follows:
providing the plurality of cocatalysts comprising at least one of the metal oxide nanoparticles, the metal sulfide nanoparticles, the phosphate nanoparticles, and the up-conversion material nanoparticles;
dispersing the plurality of cocatalysts in water and obtaining cocatalyst solution;
dispersing the cocatalyst solution in a second organic solvent and obtaining a second mixture; and
immersing the nanomotor in the second mixture and making the plurality of cocatalysts enter the cavity.

17. The method of claim 16, wherein the second organic solvent is selected from the group consisting of methanol, ethanol, formic acid, triethanolamine, triethylamine, acetonitrile, and any combination thereof.

18. The method of claim 9, wherein the porous material comprises silica porous material, glass porous material, and aluminum phosphate porous material.

19. The method of claim 9, wherein at least one inner core is selected from the group consisting of $TiO_2$, $WO_3$, $Fe_3O_4$, $Bi_2O_3$, BiOBr, BiOI, $SnO_2$, $Nb_2O_5$, $Ta_2O_5$, CdSe, CdTe, GaN, $Ta_3N_5$, TaON, $C_3N_4$, CdS, PbS, $CuInS_2$, $AgInS_2$, $ZnIn_2S_4$, GaP, SiC, LaTiON, $Sm_2Ti_2S_2O_5$, titanate, germanate, niobate, vanadate, tantalate, antimonate, molybdate, selenate, indate, chromate, stannate, $TaO_4$, $Ag_2O$, AgCl, AgBr, AgI, $AgInZn_7S_9$, $\beta$-$AgGaO_2$, $\beta$-$AgInO_2$, $\alpha$-$AgGaO_2$, $\alpha$-$AgInO_2$, $AgCrO_2$, $Ag_2CrO_4$, $AgAlO_2$, $AgNbO_3$, $InVO_4$, $InNbO_4$, $InTaO_4$, $BiNbO_4$, $BiTaO_4$, anion/cation doped photocatalyst, solid solution photocatalyst, semiconductor composite photocatalyst, $NaNbO_3$-$AgNbO_3$, $KCa_2Nb_3O_{10}$, $Ba_5Ta_4O_{15}$, $HCa_2Nb_3O_{10}$, and any combination thereof.

* * * * *